(12) United States Patent
Schubert et al.

(10) Patent No.: US 7,355,562 B2
(45) Date of Patent: Apr. 8, 2008

(54) ELECTRONIC INTERLOCKING GRAPHICS PANEL FORMED OF MODULAR INTERCONNECTING PARTS

(76) Inventors: Thomas Schubert, Level 3, 423 Bourke Street, Melbourne 3000 (AU); James Brownlie, Level 3, 423 Bourke Street, Melbourne 3000 (AU)

( * ) Notice: Subject to any disclaimer, the term of this patent is extended or adjusted under 35 U.S.C. 154(b) by 591 days.

(21) Appl. No.: 10/781,023

(22) Filed: Feb. 17, 2004

(65) Prior Publication Data

US 2005/0178034 A1  Aug. 18, 2005

(51) Int. Cl.
G09G 5/00  (2006.01)

(52) U.S. Cl. .................. 345/1.3; 345/903; 345/905

(58) Field of Classification Search ............... 345/1.3, 345/903, 905
See application file for complete search history.

(56) References Cited

U.S. PATENT DOCUMENTS

| | | | |
|---|---|---|---|
| 4,263,736 A | 4/1981 | Beierwaltes et al. | |
| 5,194,628 A | 3/1993 | Ackermann et al. | |
| 5,321,417 A | 6/1994 | Voelzke et al. | |
| 5,381,155 A | 1/1995 | Gerber | |
| 5,410,654 A | 4/1995 | Foster et al. | |
| 5,600,910 A * | 2/1997 | Blackburn | 273/157 R |
| 5,612,710 A | 3/1997 | Christensen et al. | |
| 5,633,651 A | 5/1997 | Carvajal et al. | |
| 5,779,351 A | 7/1998 | Erickson et al. | |
| 5,790,371 A * | 8/1998 | Latocha et al. | 345/1.3 |
| 5,914,698 A | 6/1999 | Nicholson et al. | |
| 5,947,592 A | 9/1999 | Barlow | |
| 5,949,581 A | 9/1999 | Kurtenbach et al. | |
| 5,995,179 A * | 11/1999 | Tamura et al. | 361/681 |
| D417,517 S | 12/1999 | Seale | |
| 6,095,668 A | 8/2000 | Rykowski et al. | |
| 6,144,562 A | 11/2000 | Voelzke et al. | |
| 6,154,945 A | 12/2000 | Voelzke | |
| 6,156,987 A | 12/2000 | Warne | |
| 6,169,632 B1 | 1/2001 | Kurtenbach et al. | |
| 6,271,806 B1 * | 8/2001 | Motoshima et al. | 345/903 |
| 6,314,669 B1 | 11/2001 | Tucker | |
| 6,379,209 B1 | 4/2002 | Tucker | |
| 6,545,591 B2 | 4/2003 | Hooks et al. | |
| 6,611,241 B1 | 8/2003 | Firester et al. | |
| 6,615,521 B1 | 9/2003 | Lutz | |
| 6,631,575 B1 | 10/2003 | Voelzke et al. | |
| 6,634,124 B1 | 10/2003 | Bierschbach | |
| 6,813,853 B1 * | 11/2004 | Tucker | 345/82 |
| 6,844,865 B2 * | 1/2005 | Stasko | 345/1.3 |
| 6,859,219 B1 * | 2/2005 | Sall | 345/1.3 |
| 6,881,946 B2 * | 4/2005 | Cok et al. | 345/1.3 |
| 2002/0113751 A1 * | 8/2002 | Knopf | 345/4 |

(Continued)

FOREIGN PATENT DOCUMENTS

WO    WO 97/39436    10/1997

*Primary Examiner*—David L. Lewis
(74) *Attorney, Agent, or Firm*—Law Office S C Harris

(57) ABSTRACT

A modular display panel is formed of a segmented symmetrical graphics panel having display pixels. The panel's interlock in for directions to allow forming larger electronic graphics panel. The preferred shape of the panel is square, defining a perimeter with for edge surfaces. Each of those edge surfaces includes an electrical connection thereon. A frame assembly forms the outer portion of the panel, thereby allowing providing of signals and power to the units.

13 Claims, 18 Drawing Sheets

U.S. PATENT DOCUMENTS

| | | |
|---|---|---|
| 2003/0082986 A1 | 5/2003 | Wiens et al. |
| 2003/0223210 A1 | 12/2003 | Chin |
| 2004/0105278 A1 | 6/2004 | Currie et al. |
| 2004/0179681 A1 | 9/2004 | Lee et al. |

* cited by examiner

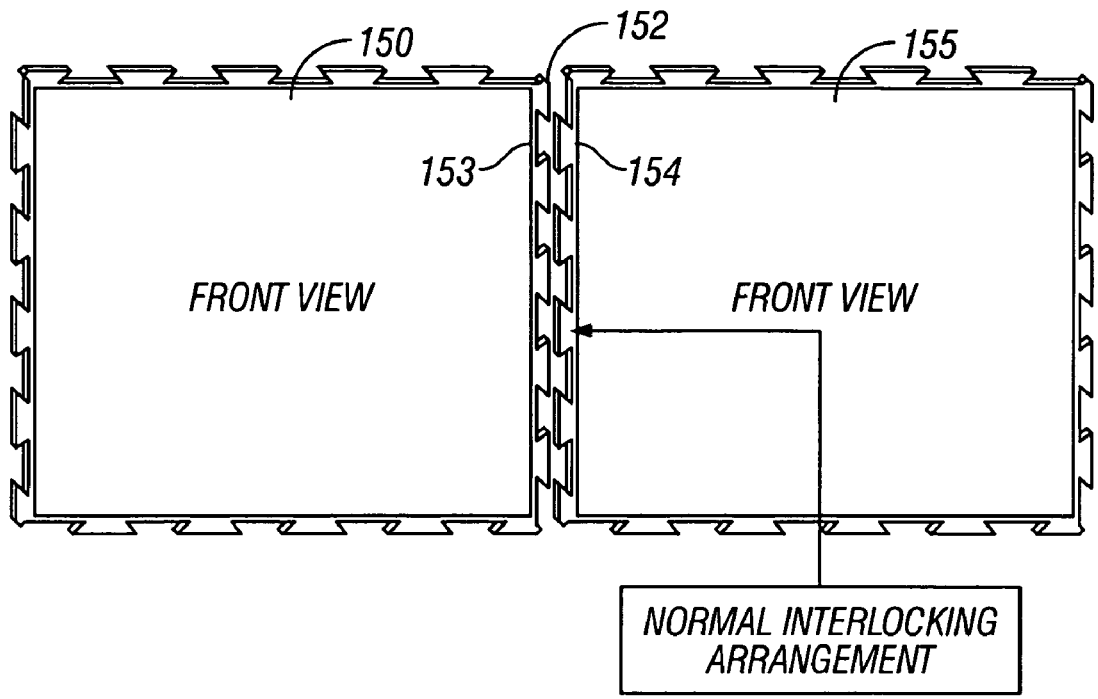
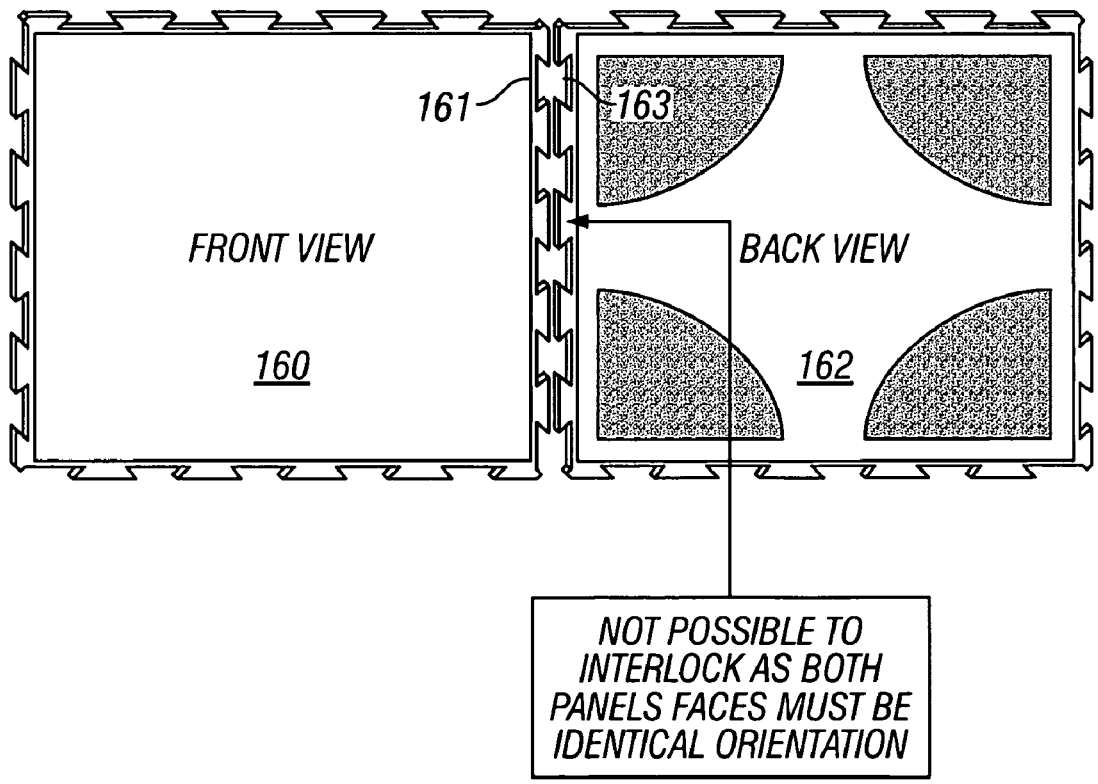
FIG. 2

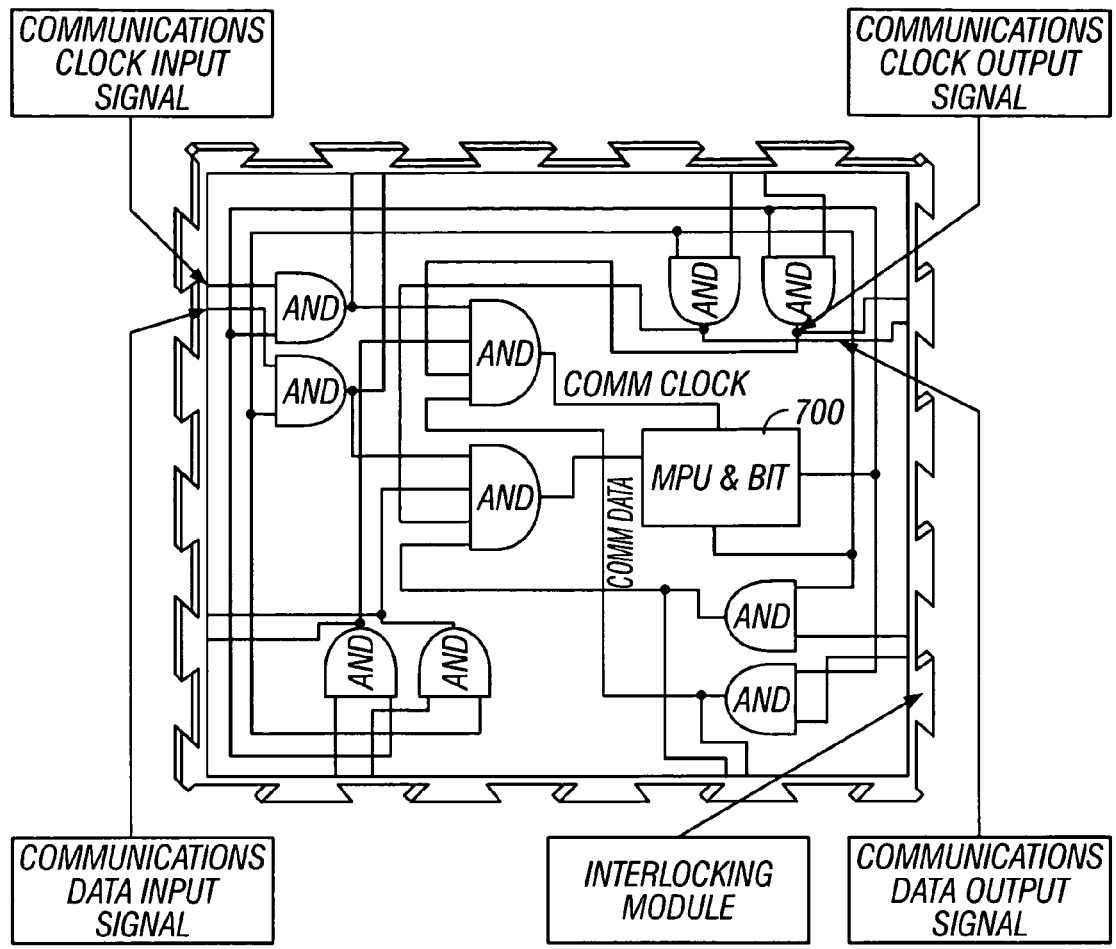

FIG. 7

BASIC STEPS TO IDENTIFY AND PROGRAM THE MODULES

· LOADS ALL ⟋800

· THE APPLICATION SOFTWARE LIGHTS A PANEL ONE AT A TIME ⟋805

· THE USER THEN IDENTIFIES WHERE THE PANEL IS SITUATED WITHIN ALL PANELS CONNECTED. ⟋810

· THE APPLICATION SOFTWARE THEN RECORDS THE PANEL IDENTIFIER AND ITS LOCATION. ⟋815

· ONCE ALL PANELS HAVE BEEN IDENTIFIED AND POSITION CODED, THE INSTALLATION IS COMPLETE.

*LATER VERSIONS OF THE PANELS WILL ELIMINATE THE USERS PARTICIPATION WHEN INSTALLING AND CONFIGURING A SYSTEM, THIS IS ACCOMPLISHED BY EACH PANEL HAVING A UNIQUE VOLTAGE ASSOCIATED WITH IT WHEN PANELS ARE INTERLOCKED.*

FIG. 8

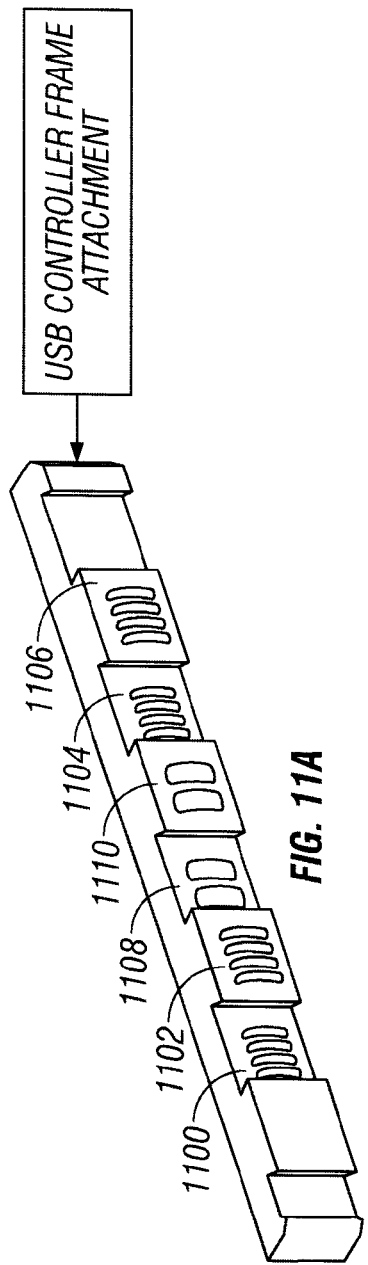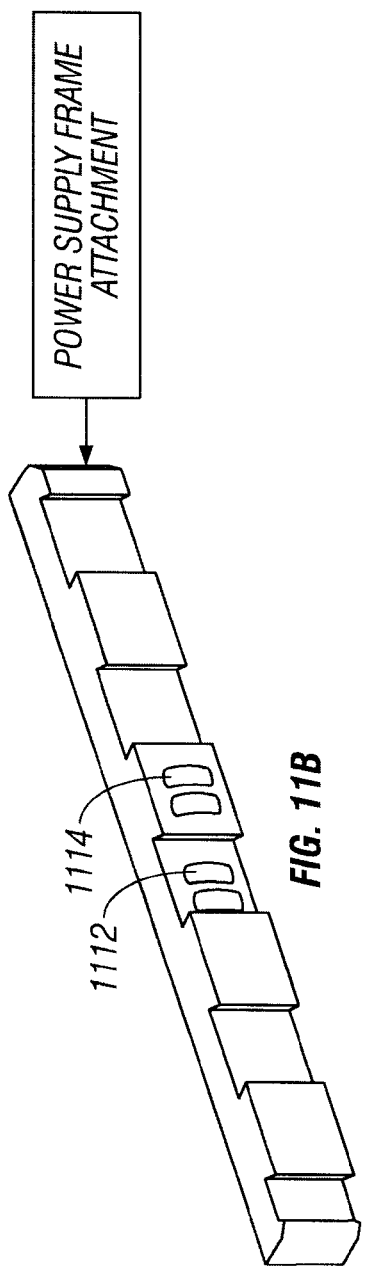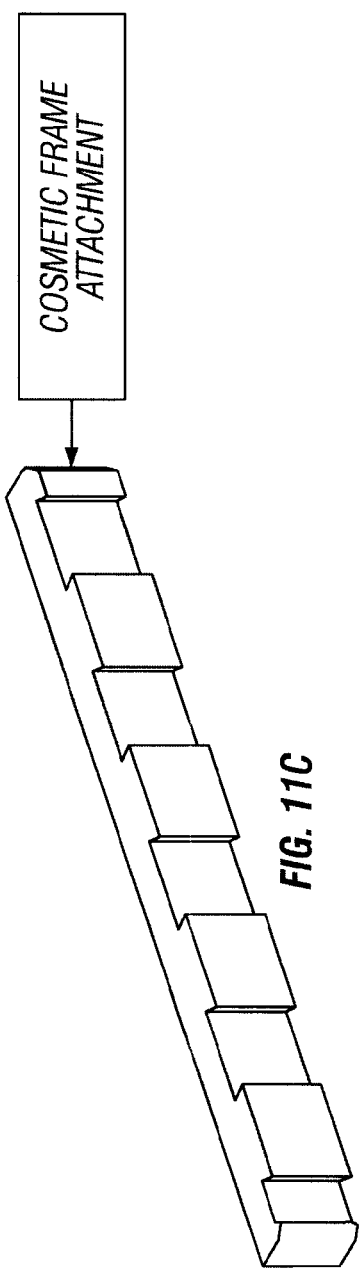

· INTERLOCK 8 OR MORE LCD MODBLOCK PANELS.

· DOWNLOAD SELECTED IMAGE FROM VISTOYS INTERNET SITE.

· DISASSEMBLE PANELS. THE DOWNLOADED IMAGE IS STILL PRESENT WITH NO POWER ATTACHED.

· ASSEMBLE THE SELECTED PIECES TRYING TO FORM THE DOWNLOADED IMAGE.

· WHEN ASSEMBLED CORRECTLY, THE IMAGE ANIMATES CONFIRMING CORRECT POSITIONING OF ALL PIECES.

ELECTRONIC INTERLOCKING GRAPHICS PANEL FORMED OF MODULAR INTERCONNECTING PARTS

BACKGROUND

Electronics allow displays to change at will and to be updated virtually continuously. Electronic graphics panels may be used both indoors and outdoors, underwater and outer space to display desired information.

Disadvantages of such graphics panels, however, include the high cost of custom manufactured graphics panels, low flexibility, limited software ability, and high installation cost. It has been estimated that there may be 50,000 or more different model variations of electronic graphics panels.

SUMMARY

The present application describes a new kind of electronic graphics panel formed of interlocking modules which can be interlocked together in order to form a graphics panel of any desired size.

One aspect describes a light emitting diode ("LED") based modular graphics panel formed of interlocking modules that can be connected into any of a number of different arrangements. A computer may be used to control the display on the graphics panel. In an embodiment, the graphics panel is framed by a frame assembly which may include electronics therein, the electronics may include a memory that stores information to form a static display for an electronic sign or other application.

Another feature of this system is the way that the modular blocks inter-connect which prevents upside down connection of the different modular blocks.

BRIEF DESCRIPTION OF THE DRAWINGS

FIG. 2 shows how a number of modular blocks can be interconnected to expand the size of the unit and how the units are interconnected only in a keyed way;

FIG. 7 shows a block diagram of the module communication;

FIG. 8 shows a flowchart of identifying and programming modules;

FIGS. 11*a*-11*c* show views of the different kinds of frame attachments;

DETAILED DESCRIPTION

The present application teaches a modular graphics panel intended for use in electronic signs and displays, and describes connectors and connections for use with this panel to form a unit that can be used for many different display purposes. The panels may interlock to form a matrix of interconnected modular panels. An important aspect of this system is the symmetry of the parts, which enables interlocking of the various parts to form larger parts, and the keyed interconnection which prevents the panels from being improperly connected. The basic building blocks can be combined in this way in order to form larger display units.

A frame portion surrounds the interlocked panel edges. The frame may include both power supply connections, as well as signal connections to the matrix of interlocked panel units.

Figure 1:
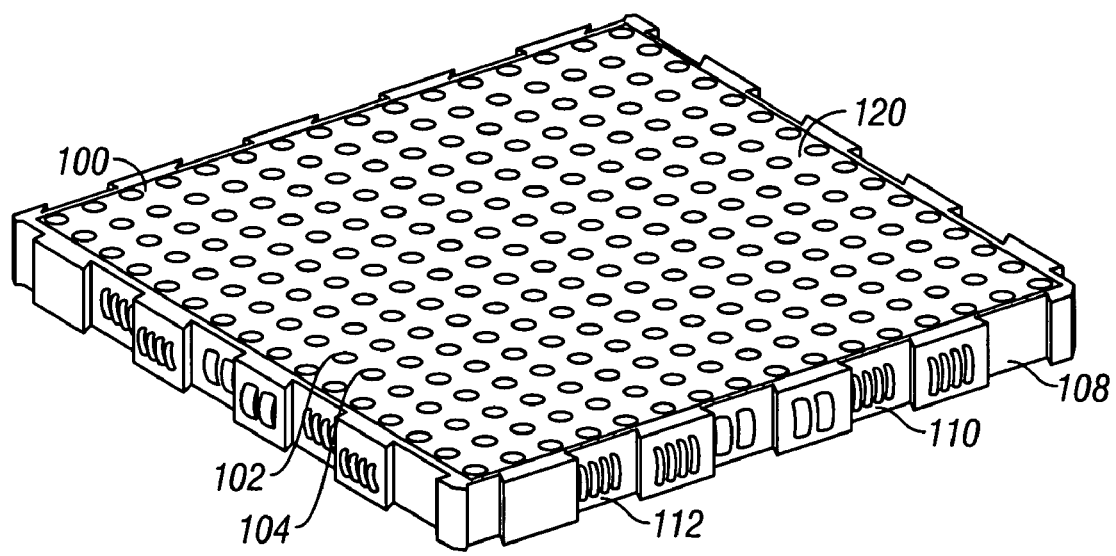
FIG. 1 shows a plan view of a basic modular block of electronic graphics panel of the present device.

The basic structure of the module is shown in FIG. 1. The symmetrical graphics panel 100 includes a number of light emitting diodes (LEDs) 102, 104 which can be individually turned on to form any desired display. In this embodiment, the illuminating devices are LEDs, but it should be understood that any kind of illuminating device could be used. In another embodiment, the illuminating device can be a liquid crystal device. In general, however, any kind of illuminating device including plasma, DMD based projection, and the like can be used.

The symmetrical shape and the position and size of the interlocking protrusions prevent the modules being interlocked unless the light emitting faces of the modules are all facing in the same direction. In the disclosed embodiment, the modules are formed with trapezoidal interlocking shapes. However, other embodiments of interlocking shapes may be used. In one such embodiment, a two-part movement allows locking of both horizontal and perpendicular rigidity of the connection between the edges. This could use a snap assembly within the current interlocking system, or could using a system that was beveled in two dimensions two allow the interlocking. Alternatively, half depth flanges that interconnect may be used.

Other shaped interlocking operations may also occur, such as using slotted cylinders with internal contacts to avoid sharp edges.

A basic embodiment uses a 10 inch square unit, with 256 of the LEDs, arranged into 16 rows and 16 columns defining a matrix. It should be understood, however, that other sizes are contemplated. Four inch size modular panels may be used for units that are intended to be viewed more closely. An 18 inch modular panel may also be used for an application that will be viewed from relatively long distances. Also, while the description refers to these units as being square, it should be understood that the basic shape is a perimeter that has four sides, forming a square; where each of the sides extends in a substantially linear direction. However, each of the sides is not flat, as a perfect square would be; rather each of the linear sides has a beveled interconnecting portion thereon. Effectively, the envelope of the outer shape is a square. For purposes of this specification, however, we describe the sides extending in linear directions with the understanding that the sides are not necessarily flat.

Each edge 108 of the panel includes a mechanically interlocking portion 110 having a basic trapezoidal shape which allows another, mating unit, to interlock with each other unit. Each section of the interlocking unit also includes connector portions 112, which may be formed of stainless steel or other conductor.

In the embodiment, each side of the panel has five connectors, thereby forming a total of 20 connecting pins on each of the four sides. These pins supply power, row and column scan signals as well as serial communications as described herein. The placement of the conductors on the edge portions avoids exposed wires and exposed wiring. Of course, the number of conductors is a matter of design choice, and other numbers of pins may be used therein.

FIG. 2 shows how multiple units can interlock to form a larger interlocking matrix panel. As should be apparent, any number of displays can be interlocked in any desired shape to form the final display panel. For example, a number of units may be interconnected to form a display image of over 20 ft. square with 160,000 LEDs and 520 ft.$^2$ of graphics panel display area. FIG. 2 also shows the keyed configuration of the modular connections to prevents the units from being interconnected In an incorrect way. Each unit has a front side for display, shown as 120 in FIG. 1. Each unit also has a rear side, which cannot be seen in FIG. 1, but is the opposite side from the side shown. The units must be interconnected such that each of the units has their front, display portion, facing in the same direction. FIG. 2 shows the normal interlocking relation, where unit 150 is connected to unit 155. Both of them have their front faces facing in the same way. Because of this, the female interlocking part 153 of unit 150 finds a proper mating with the male interlocking portion 154 of unit 155. Note, however, the bottom portion with units 160 and 162. Unit 162 is upside down, and hence the female interlocking portion 161 of unit 160 faces the female interlocking portion 163 of unit 162. This makes it impossible for the units to properly interlock. In this way, the shape of the interlocking portions inherently prevents the units from being improperly connected to one another.

In an embodiment, an interlocking frame segment forms the perimeter of the assembled display device. Circuitry within the frame may supply the power, digital information, and controls from an external host device to the connected modular unit.

The frame segment may also supply memory mapped images. A nonvolatile memory in the frame assembly can be used to control the state of each panel, and hence each LED within the panel. Of course, the contents of the nonvolatile memory can itself be changed in order to change the display on the graphics panel.

A number of benefits are obtained from the modular panel. Importantly, one of these benefits is based on heat generation. Each of the multiple graphics panels distributes its own heat, avoiding the need for external cooling systems.

In an embodiment, the matrix of panels is controlled by an external processor or computer that connects to the matrix via a frame segment.

Figure 4:
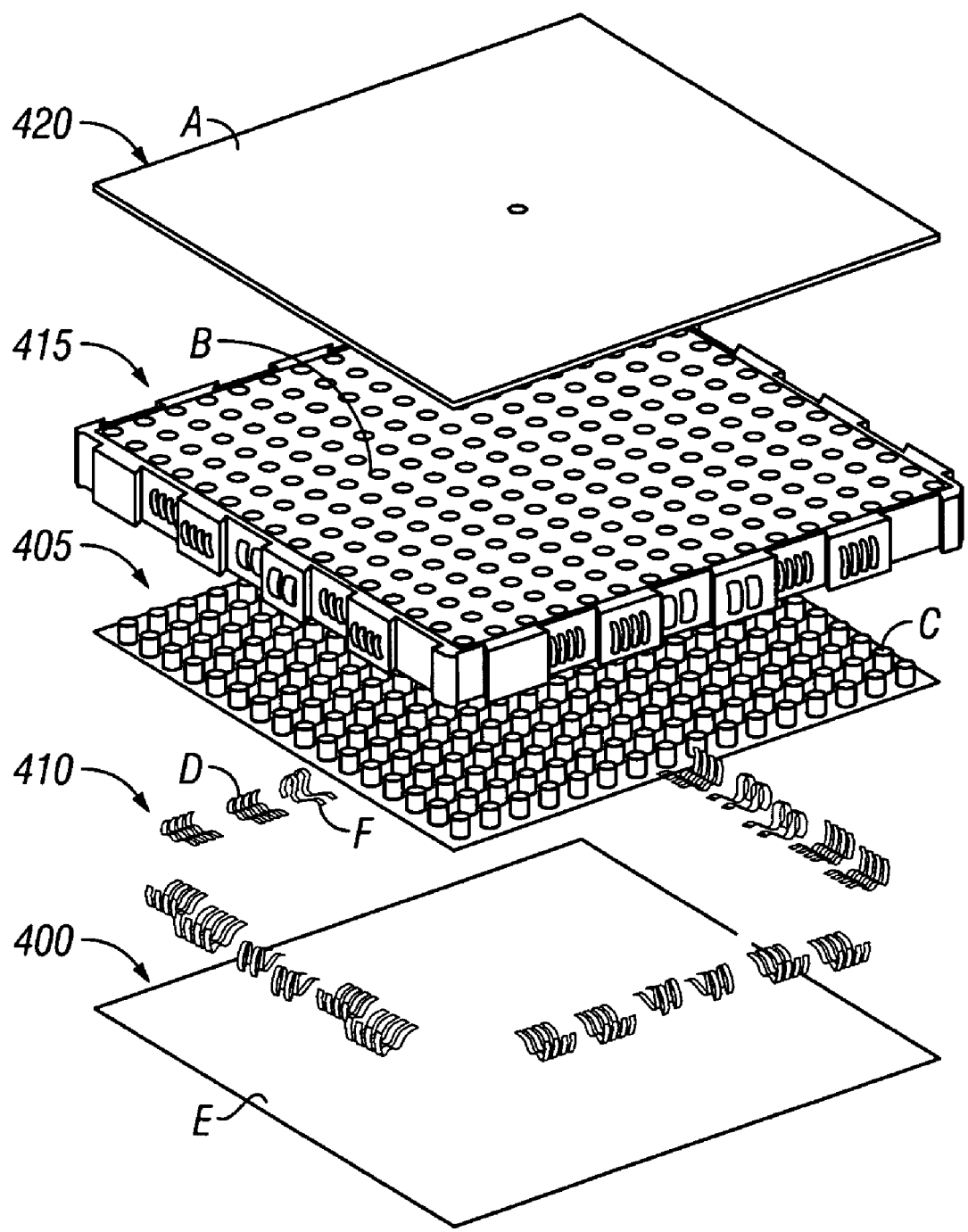
FIG. 4 shows an exploded view of the layers making up the modular block.

Construction of the module of the embodiment can be done as shown in the assembly view of FIG. 4. A baseplate 400 of appropriate size is first formed. As noted above, this can be of any size or shape but is preferably square. A printed circuit board of the same size is also formed as 405. Connectors for the printed circuit board are also used. In this embodiment, the connectors include 20, stainless steel flexible conductors, shown as elements 410, that are connected around the parameter of the circuit board 405, for example, by soldering.

The printed circuit board 405 is screwed or otherwise attached to a top enclosure 415. The connection can be via molded studs on the top connection portion using self tapping screws. A lens assembly 420 is finally located in place on the top enclosure and press fitted onto the top enclosure to form a seal. The lens may diffuse the output light.

The connectors 410 overlap the slots on the edges of the top enclosure portion 415 allowing reinforcement of the overall structure. This forms a symmetrical assembly which can be located in any of multiple different orientations.

Figure 5:
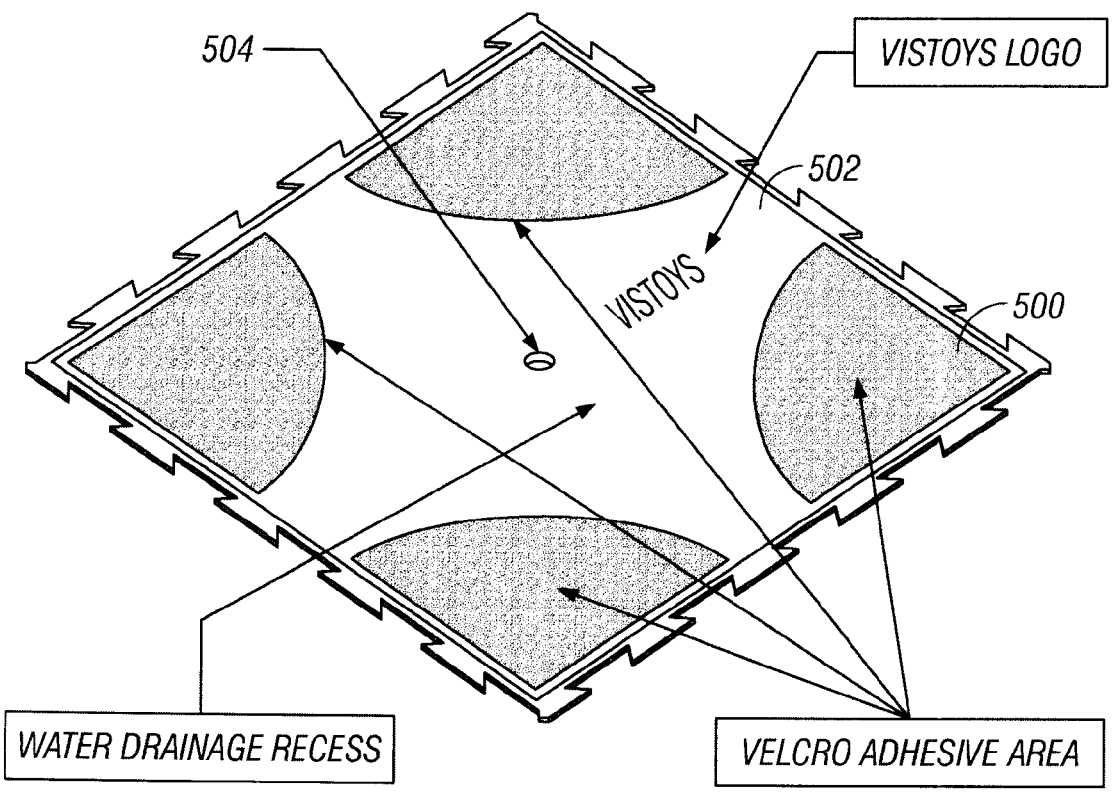
FIG. 5 shows a detailed view of a bottom layer of the module device.

A detailed diagram of the rear portion 400 of the module, forming the back panel of the module assembly is shown in FIG. 5. The device includes four raised quarter circle sections which can be used to locate adhesive material such as Velcro™ brand hook and eye type material, or other adhesive. A number of Velcro adhesive areas 500 which allow mounting the panels against a backing board with cloth type materials. Because of the lightweight construction of the device, this can be a very cost effective way of forming the device. However, water drainage recesses, such as 502, are left between the Velcro adhesive areas 500, to drain any water buildup. A mounting hole 504 is also provided to allow more conventional mounting options. Due to the symmetrical interlocking shape of the module, only a center mounting hole is required, since the symmetrical shape inherently maintains the balance.

An external controller operates to produce a bitmapped image that produces scan signals that drive the LEDs. This image may be formed and communicated over a USB interface, or any other interface which is available for driving computer hardware.

Figure 6A:
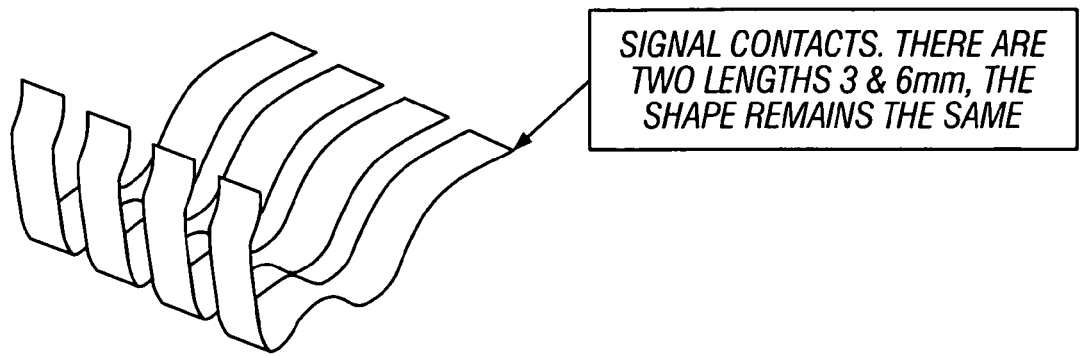
FIGS. 6*a* and 6B show information about the signal and power contacts which are used.
Figure 6B:
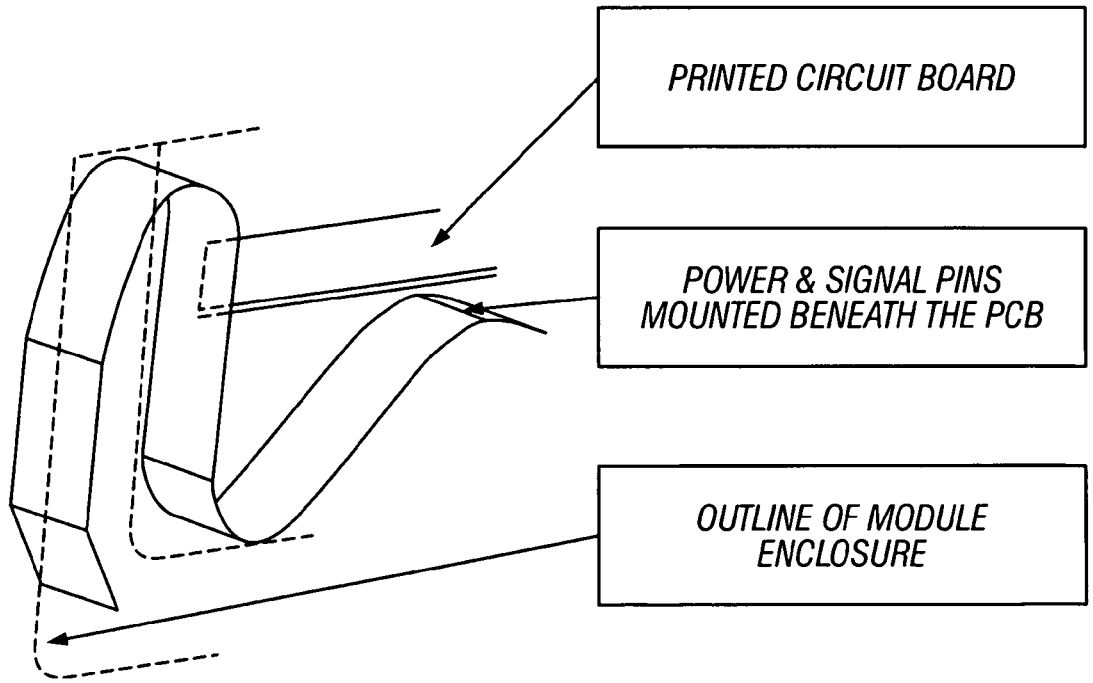

The contacts used in this device are preferably formed of stainless steel, to accommodate outdoor use. FIGS. 6A and 6B show different kinds of connectors which are used. FIG. 6A shows the signal edge connectors which are used on the edge of the module. These signal contacts communicate signals between the different modules. The power supply contacts are shown in FIG. 6B. Connection to the power supply is preferably carried out in a central location on the module, to allow each module to be rotated.

The device can be controlled by controller logic, which preferably communicates with the graphics panel via a high-speed interface such as USB. The control circuitry for the graphics panel includes module communications, (multiplexed or non multiplexed LED driving configurations), and signal steering logic. A communication path between the host device and each module allows proper operation of the module.

FIG. 7 shows the communications overview, within the module, which is low cost and may use discrete logic. Of course, it is possible to form a system using low-cost microprocessors. There are 2 main incoming signals: clock and data, which originate from the host device. It is possible to communicate via asynchronous single line data. However, when 4 or more modules are connected, the distortion of these signals would present data errors. For this reason, the incoming data is sampled and synchronized with an incoming clock signal.

Clock and data are generated by the USB frame controller device, gated and summed under the control of an 8 bit MPU on each module then sent back out buffered and reconstituted to the next connecting modules.

The 8 BIT MPU can take control of these signals when a response is required from a host device. The communications circuit thus is bi-directional with all command packets time slotted.

These signals typically need to travel a relatively short distance between interlocking modules. Discrete logic can hence be used reducing part costs. Programming of each module is the combination of user assistance and the application software. The user defines the system orientation (the configuration of the panels) as described herein. The application program then changes the identifiers on each panel to control the direction of the led drive matrix signals.

Each module is assigned with a unique 32-bit sequential identifier, which is hardwired into the module at factory assembly time. During a startup mode, the host device requests each module to supply its identifier. A list of identifiers is made in the controller, and the controller also assigns each module a new, graphics panel-based identifier upon system initialization and after the assembly of the different modules. The graphics module microcontroller then steers data signals to the appropriate side each module in the appropriate way for correct operation of application.

The startup mode to identify and program the modules is described herein and with reference to FIG. 8 which shows the flowchart which is followed to identify and program the modules. First, at 800, the application software loads all the different unique identifiers from all of the different units. These are arranged in order of reception, or in some other order, into a map. At 805, output signals are sent to each panel based on the identifiers, one at a time, to cause the panel to light. The user watches the output panels, and identifies the location and orientation of the panel using a user interface at 810. The application software records this location at 815 for the module, and stores it as a map. Each module may be assigned a sequential (local) address for ease of addressing. For example, a matrix of addresses where the top left unit is always unit 00, the next unit to the right is unit 01, etc, could be used.

Alternatively, a coding system using voltage dividers could be used, so that the position of the modules could be automatically detected by the voltage.

The communication protocol is simplified because of the environment of an electronic graphics panel. Power is initially applied to all modules, maintaining the communication path as one way, from host to modules. If the host device needs to receive data from the module, it sends a data receive command, along with the module identifier. Each of the different modules receives this information, but only the appropriate module responds within an allocated time slot.

Figure 9:
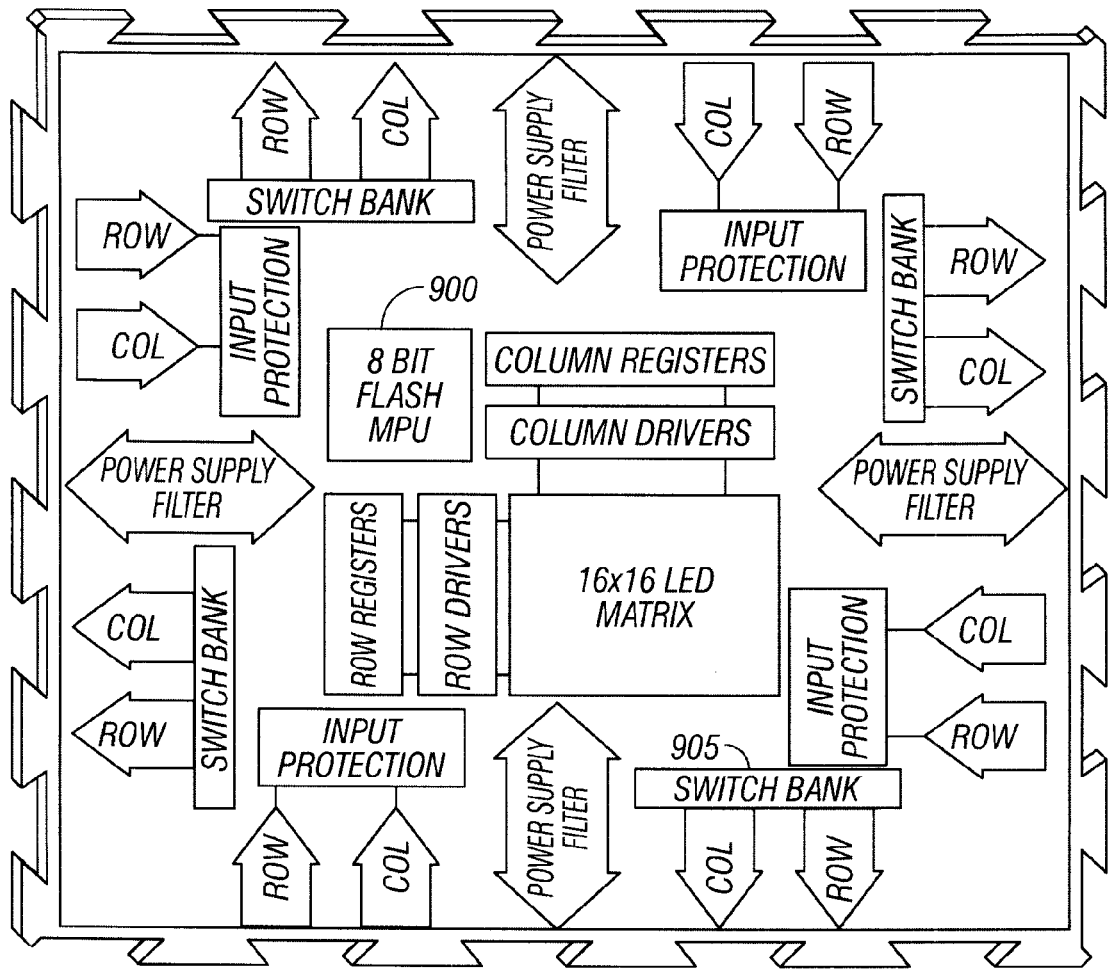
FIG. 9 shows the communication flow into and out of each modular device including the Tristate buffer.

FIG. 9 shows how the simplified 8-bit microprocessor unit controls the guts of the communication. Four commands are programmed into this microprocessor which controls all of the functions that are needed to align the data path and the communication. Each of the functions are time slotted, meaning that they can only occur within a specific allocated time slot. This enables sharing of the communication line.

The four alignment commands include:

set module ID which request the identifier of a module;

set module ID which sets a new and temporary identifier for the module;

set signal direction—as explained herein, the modular unit can be installed in multiple directions, and this command allows setting one of four directions for row and column;

reset—this command verifies to the module that the host has received and processed a command which has been sent by the module.

In addition, each module's microcontroller 900 measures the voltage that is being supplied on the power connection pins. The different units can be powered by DC (Direct Current) voltage either 5V or 8V power supplies, and the monitoring ensures that the power supply is within specified parameters plus or minus 10% of the desired power supply amount.

If the voltage parameters are outside the desired range, then the microcontroller 900 responds to the next host poll, to inform the host device of an incorrect voltage. This may set an alarm, that can be remedied by additional power supply voltages or the like.

In order for each module to function correctly, the row and column scan signals that drives the LED matrix must be connected across the array from module to module. In the embodiment, six signals (in addition to power signals), are connected to each module via the edge connection pins. This allows full rotation of each module in any desired direction void of polarizaion. The six signals that are attached include:

Row clock—representing the row clock signal. Data is synchronized to this signal.

Row data—representing the data stream that is sent to the LEDs.

Row reset—a signal to reset the data and clock signals as needed.

Column clock-column data is also synchronized to this signal.

Column reset which reset the data and clock signals for the column.

Column data—which carries the data stream for the LEDs.

Row and column signals represent illumination of individual lighting components in a graphic module in a matrix or non matrix configuration, matrix being defined as signals for X and Y axis in signal generation. For example, if it is necessary to to illuminate 64 LED'S then two electronic drive options are available. It would be possible to drive each lamp individually, which requires 64 independent signals or driving components. Alternately, it is possible to drive the 64 lamps in a matrix configuration, e.g., an 8×8 matrix. Eight row signals are driven, and eight column signals are driven simultaneously. This results in illumination of a single lamp within 64 lamps with only 16 signal drivers as opposed to 64.

One difference is that fewer signals are necessary to drive 64 lamps. Also, this provides an average dynamic power consumption, as opposed to an actual static power consumption which may be considerably less.

Row data signal selects the LEDs that need to be illuminated. This is a single serial data stream with logic levels that illuminates one or all of 256 LED or lamps on the one graphic panel, This signal is in digital format. and logic 1 (5 or 8 Volts) will turn off a single LED, where as a LOGIC 0 will illuminate one, or all of 256 LEDs or Lamps.

The Row data stream corresponds to the Y axis of a module or multiple modules, Horizontal scan signal.

For example 16 modules are interconnected horizontally, a matrix configuration of 16×16 row data signals=256 individual LEDS horizontal by 16 vertical, as each panel is 16×16.

Row reset is a signal to reset the data and clock signals as needed. Row reset signal is used to synchronize row digital data streams to a row digital clock signal. Each time an LED needs to be illuminated the data stream is synchronized with a clock pulse per LED. If these signals are not reset in sequence before column data signals are present we have an effect on the graphic panel called ghosting. This appears as a halo around each LED or illuminating device. For crystal clear images, ghosting needs to be eliminated. Hence the need for a Row and Column reset signal.

Column clock—column data is also synchronized to this signal.

Column reset resets the data and clock signals for the column.

Column data—which carries the data stream for the LEDs.

As described, there are 3 signals needed to efficiently illuminate ROW and COLUMN LED'S. Reset, Clock & Data. These 3 signals are identical in digital format for X and Y matrix configurations. Data signal determines which of the 256 leds or lighting components are illuminated. Clock signal is used to synchronize each lighting component with the data stream. Reset is used as the end of the graphic panel application, and prevents ghosting or halo effects around each of the 256 LED'S. These three signals are present for Column and Row scan signals.

Figure 10:
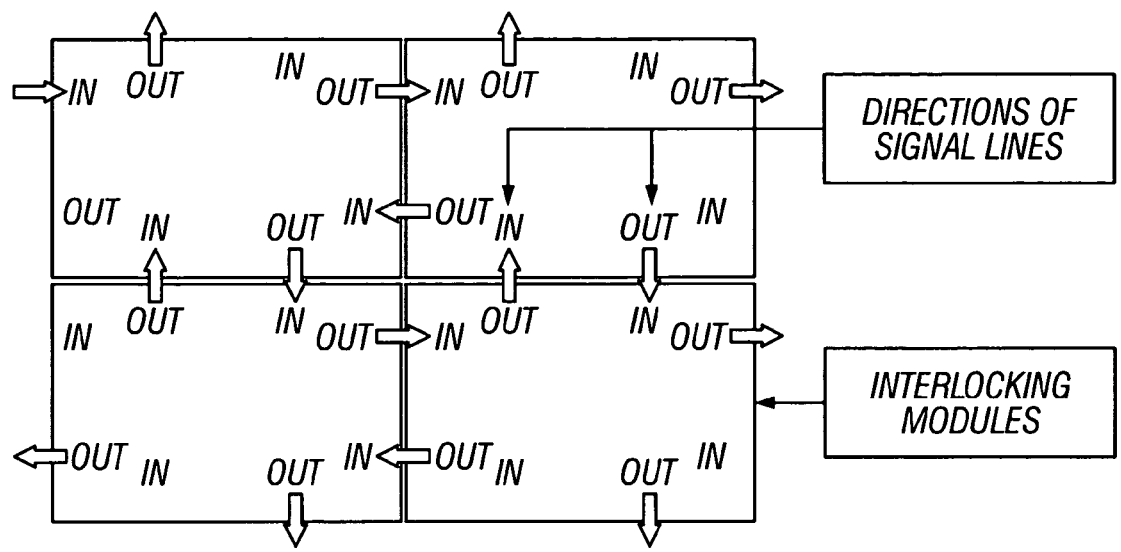
FIGS. 10 and 11 illustrate how signals can be properly and improperly sent between different devices.

FIG. 10 illustrates how incorrect connections of outputs connected to inputs could result in signal clashes, and distort the scan matrix configuration. The interlocking graphic panel has 4 sides which can connect. In the embodiment, possible for connection. Each side of a graphic panel has identical electronic signals. If the signal flow to and from the panel is not controlled, then the result is total signal distortion. FIG. 10 shows this possible signal distortion, and how it could confuse the electronic control.

According to the present system, the interlocking graphic module has the ability to interlock one of four sides without polarization, control and orientation of these signals make this possible.

Figure 11:
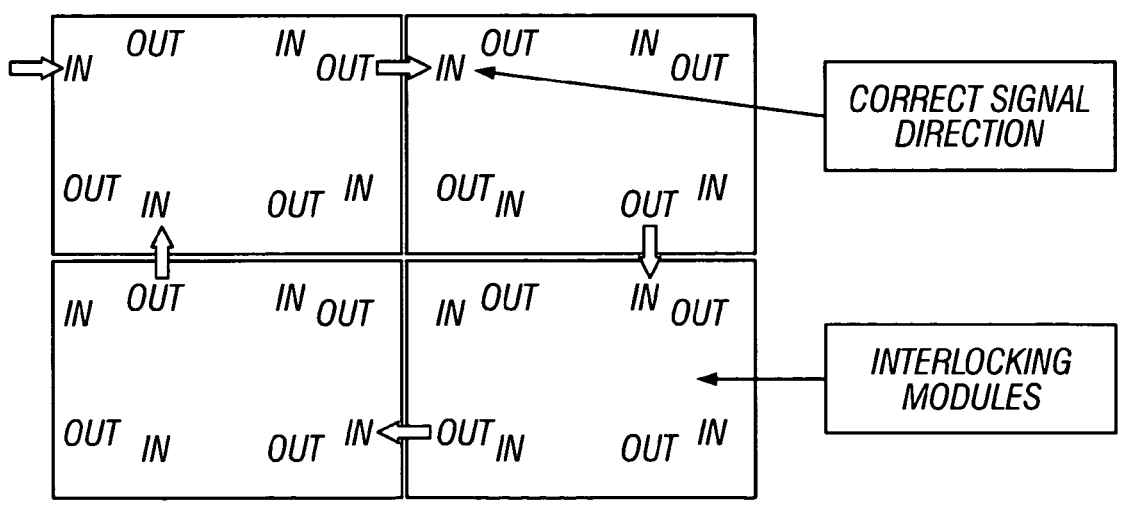

FIG. 11 illustrates how each signal can be connected to a proper signal line. Tristate buffers are used on each side of the module, under control of the microcontroller. The buffer can be tristated to produce a floating input (output). In this way, (Only) one side of the module is enabled at any time. The switching of the tristate buffers is done using a tristate bus driver, shown as 905 in FIG. 9. The use of the Tristate driver enables the same pin to be used for both input and output by selectively maintaining the device in Tristate.

As described above, the frame attachments are used to provide connections to and from the modular block.

Figure 3:
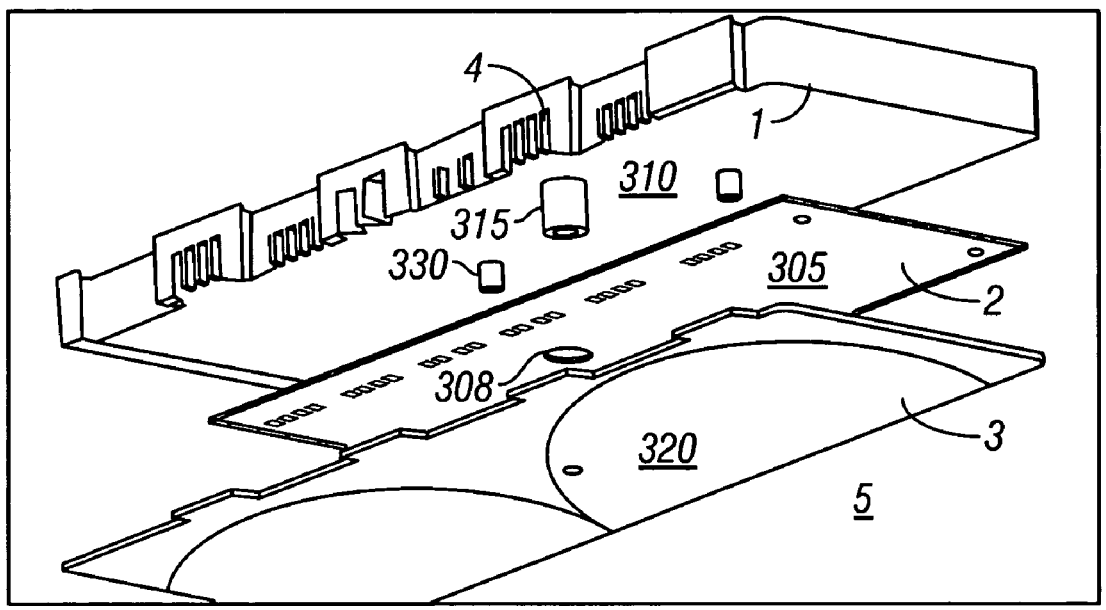
FIG. 3 shows an exploded view of a frame portion.

FIG. 3 shows an exploded view of the layers of an interlocking frame segment that supplies power and digital information to each of the modular assemblies. The power and digital information is obtained from a host device, which may be any computer, e.g., the computing device shown in FIG. 12, and described herein. The host device provides memory mapped "images" which are sent via the connectors to the respective graphics panel. The images are themselves stored within nonvolatile digital memory within the frame assembly. A microcontroller accesses the nonvolatile memory in a specified order, when it is necessary to change the state of any of the illuminating devices.

The frame segment as shown in FIG. 3 includes three connected parts. A printed circuit board 305 may include electronics including a microcontroller. The printed circuit board is formed with alignment holes 308 therein. The top enclosure of the frame assembly, 310 includes alignment studs such as 315. Each of the alignment holes 308 is next to a respective one of the alignment studs 315, such that the outer surfaces of the alignment studs 315 maintain the inner surfaces of the hole 308 in position. The bottom baseplate 320 covers the printed circuit board 305 and may screw into the studs 330, 332.

An assortment of frame attachments can be used, each supplying various functions to the arranged graphic panels. These are grouped in to three classifications. Three different kinds of frame attachments can be used. The three varieties are shown in FIGS. 11A-11C.

FIG. 11A shows the electronic frame attachment USB controller frame attachments, which has signal style pins 1100, 1102, 1104, 1106, and power supply pins 1108, 1110. This provides both signal and power to the array. The power supply attachment is shown in FIG. 11B, only having a printed circuit board populated with electronic power filtering components having power pins 1112, 1114 and signal control pins 1100, 1102, 1104, 1106. An optional cosmetic frame attachment shown in FIG. 11C also has a printed circuit board, power supply and signal pins void of electonic components. A cosmetic frame attachments shown in FIG. 11C has no connecting pins.

For the system to operate correctly, the USB controller frame attachments must be connected to a the module. The controller frame provides the digital signals and power supply to all of the connecting modules. The controller frame attaches to a host device via USB serial port or hub, The controller frame includes a USB microcontroller, nonvolatile memory and glue logic in order to supply the necessary digital signals. The signal shown in FIG. 11A have the following functions:

| PIN NO | PIN DESCRIPTION |
| --- | --- |
| 1 | OUTPUT ROW DRIVE DATA |
| 2 | OUTPUT ROW DRIVE CLOCK |
| 3 | OUTPUT ROW DRIVE RESET |
| 4 | OUTPUT DATA COMMS |
| 5 | OUTPUT DATA SYNC CLOCK |
| 6 | OUTPUT COLUMN DATA |
| 7 | OUTPUT COLUMN CLOCK |
| 8 | OUTPUT COLUMN RESET |
| 9 | POSITIVE POWER 5-8 V |
| 10 | GROUND OR OV |
| 11 | GROUND OR OV |
| 12 | POSITIVE POWER 5-8 V |
| 13 | INPUT COLUMN RESET |
| 14 | INPUT COLUMN CLOCK |
| 15 | INPUT COLUMN DATA |
| 16 | INPUT DATA COMMS |
| 17 | INPUT DATA SYNC CLOCK |
| 18 | INPUT ROW RESET |
| 19 | INPUT ROW CLOCK |
| 20 | INPUT ROW DATA |

In essence, the digital signals provide row and column matrix scans signals to each of the modules, to address each of the lighting components on each of these modules.

Figure 12:
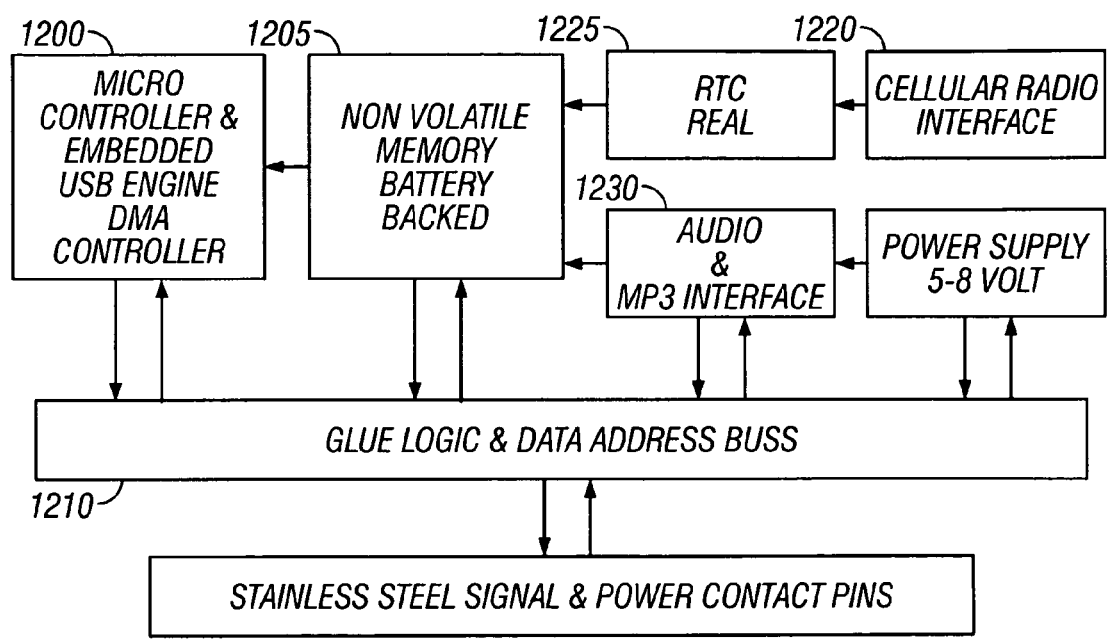
FIG. 12 shows a block diagram of a USB frame controller and a typical host device.

The control of single or multiple interlocking graphic modules is carried out by the frame attachments shown in block diagram form in FIG. 12. The USB frame attachments includes a microcontroller 1200 which also includes a USB engine and direct memory access (DMA) controller. A nonvolatile memory 1205 with associated battery stores the data which has been received from the microcontroller. In addition, a glue logic module 1210 provides the logic, as described herein, for driving the system.

The microcontroller communicates the USB protocol and downloads memory mapped data from the host device. This memory mapped data is stored into the nonvolatile memory 1205. After the data downloading is complete, digital data in the memory may be converted to digital signals either as multiplexed or non multiplexed row and column scan signals to drive the adjoining scan modules. After completion of downloaded data complete the download of data, the USB controller frame can run independently from the host device. The system is capable of running in a real-time mode, in which continuous video and audio stream applications are continuously downloaded to the graphics panel. In a standalone mode, the system runs independent of the host device after a completely successful download. The memory mapped images which are stored in the nonvolatile memory are continually displayed on the graphics panel until new data is sent. In this embodiment, a cellular radio interface shown as 1220 may be used to allow the data in the nonvolatile memory to be updated.

The USB frame controller also includes, as conventional, a real-time clock 1225, as well as an audio processor 1230 that enables communicating via the real-time clock.

Figure 13:
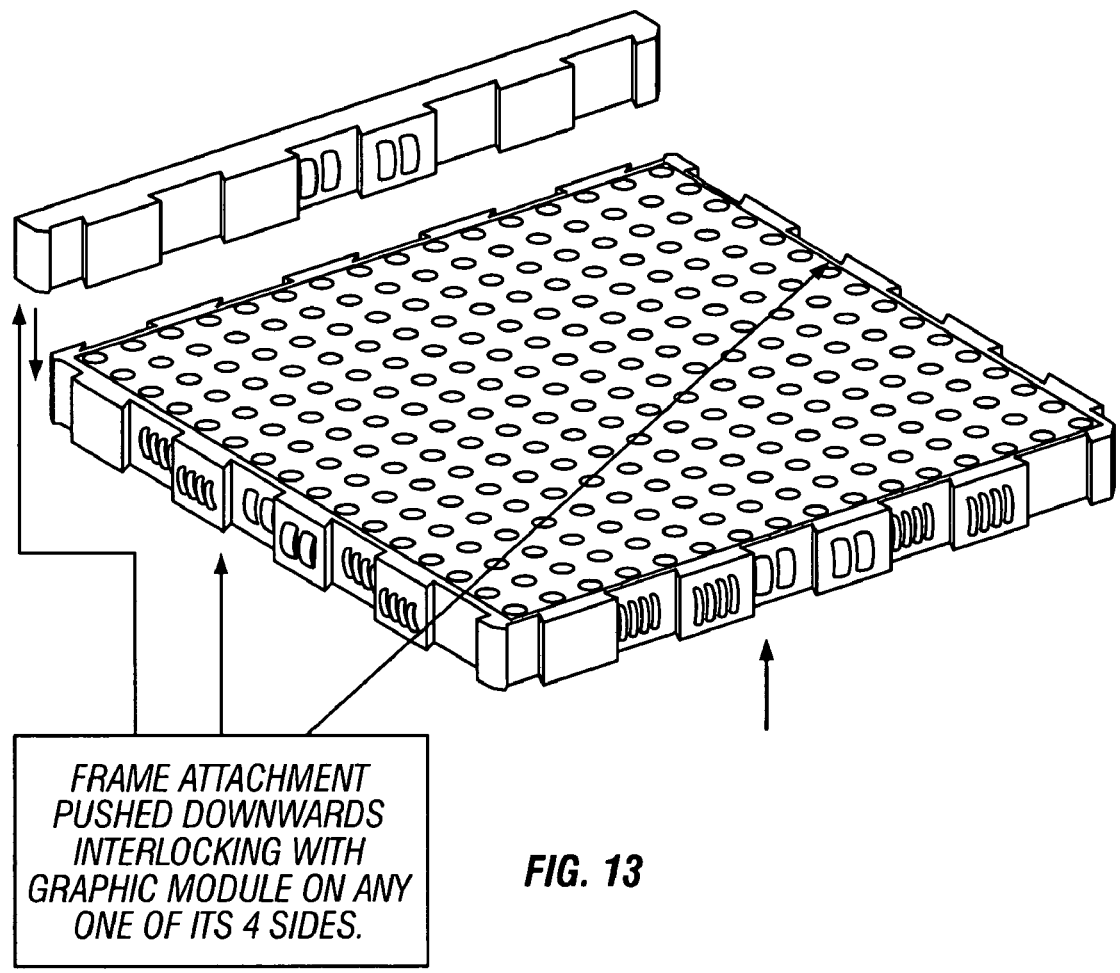
FIG. 13 shows how the frame attachment is attached to the module.

As an alternative to the cellular radio interface, of the USB port can be used locally for example with a portable or mainframe computer. An infrared interface may also be used. In operation, the frame attachments may be attached to a graphics module as shown in FIG. 13. The frame attachments can connect on any of four sides of any of the modular systems allowing total flexibility. Only one USB controller frame per system is necessary, and the rest of the external frames can be additional electronic functions, cosmetic frames and power frames that can be used anywhere along the outside of the graphics modules that form the application.

The power frame attachments may only be necessary when more than a specified number of graphics panels, e.g. more than 10 to 16 graphics panels, are interlocked. This also may depend on the type of illuminating device which is used; for example, indoor illuminating devices may consume less power than outdoor illuminating devices. Each of the different power frame attachments may be associated with its own external power source which terminates inside the substrate of the power frame on a printed circuit board. Copper rods of a size capable of carrying 10 amps may be soldered to the printed circuit board and to the connectors on the stainless steel pins.

Figure 16:
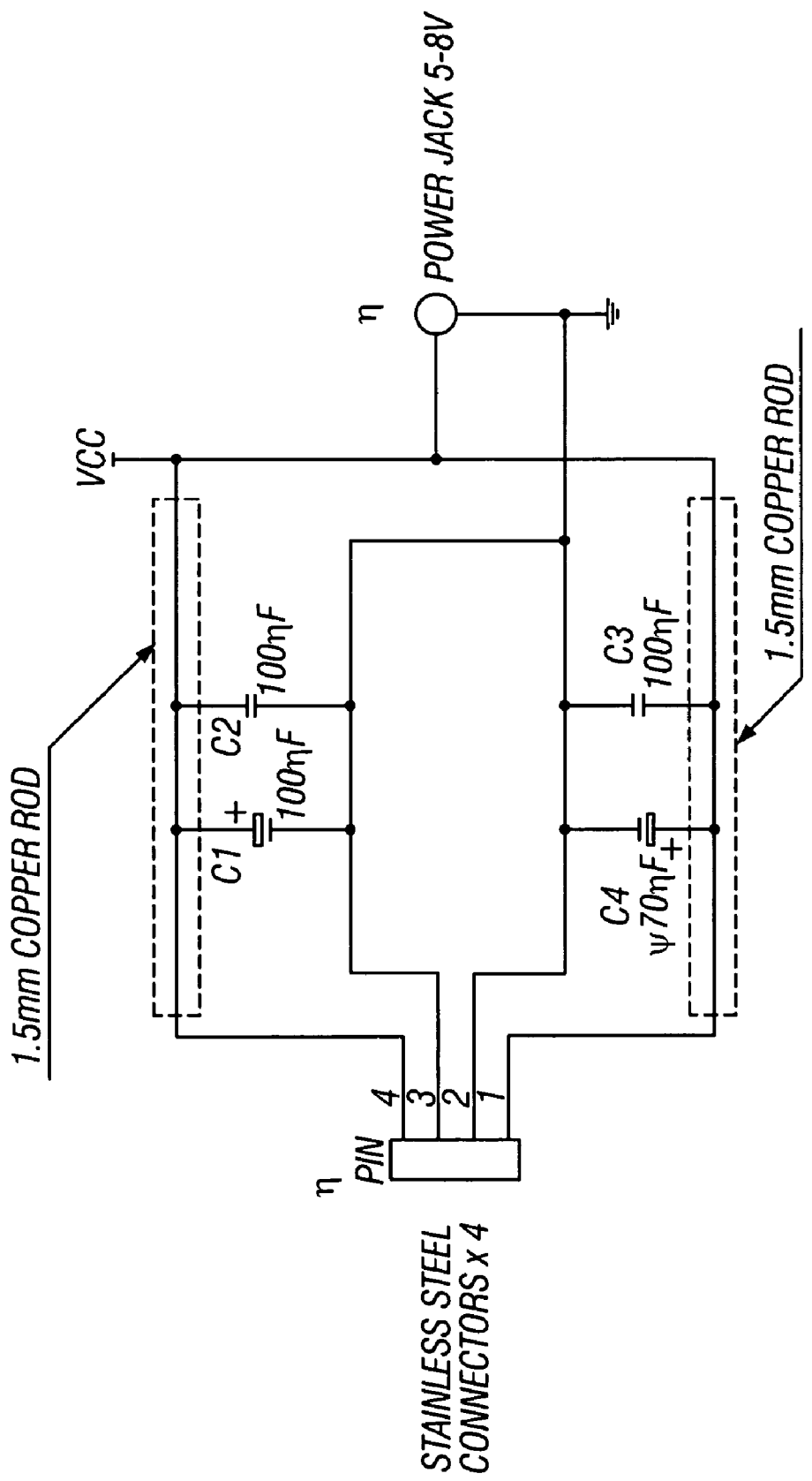
FIG. 16 shows circuitry of the power frame attachments.

FIG. 16 shows a more detailed diagram of this power circuit, including capacitors to filter both high and low frequency harmonics generated by the switching. In this embodiment, 470 uF/16 volt tantalum capacitors can be used for the low-frequency, and 100 nF/50 volt capacitors can be used for the high frequency harmonics.

Figure 14:
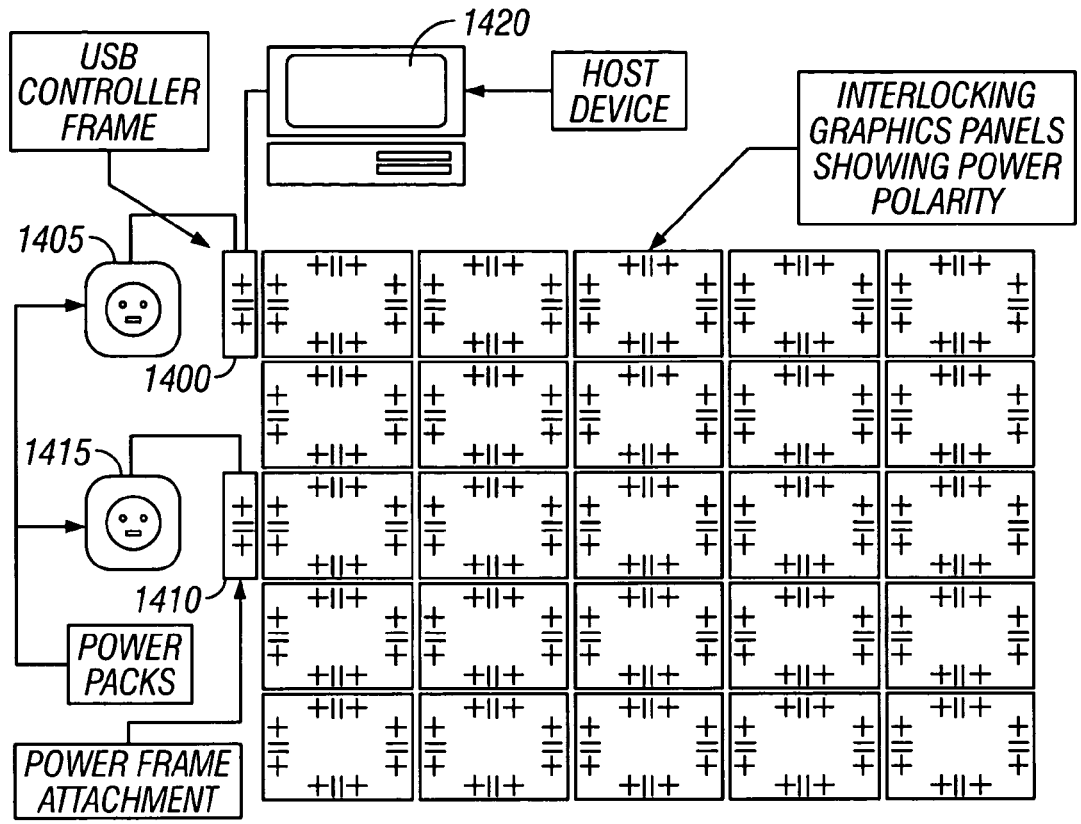
FIG. 14 shows a typical complete application.

The power jack adapter may be a 4.5 mm power jack which mounts flush with the top power frame enclosures. For example, FIG. 14 illustrates how an application with 20 graphics panels or more may include two different power frames, a first from the USB controller frame 1400, connected to its own power supply 1405. A second, dedicated power frame attachments 1410 is also connected to its own power supply 1415. The USB controller frame 1400 is also connected to the host device 1420.

The way that the modules are interconnected inherently maintains the proper power polarity. In the embodiment, polarity directions include positive connections on the outside and negative connections on the inside.

An application program enables forming the proper locations for the different units. Each panel measures its power source, and calculates where a power frame configuration needs to be added. Each graphic module can measure its own incoming power supply needed to function, if power is below or above 10% of programmed specifications, the graphic module itself will alert the USB frame controller via the internal communications path per module. Depending on the Host configuration settings the user will be alerted either by a display on effected graphic modules, or the host PC alerting the user with onscreen prompts.

The diagnostic program running on the PC or host device visually identifies appropriate power frame attachment locations on the user or host visual screen. If PLC or keyboard interface is used, the USB frame attachment automatically lights the graphic panel locations for optimum of power frame attachments.

Figure 15:
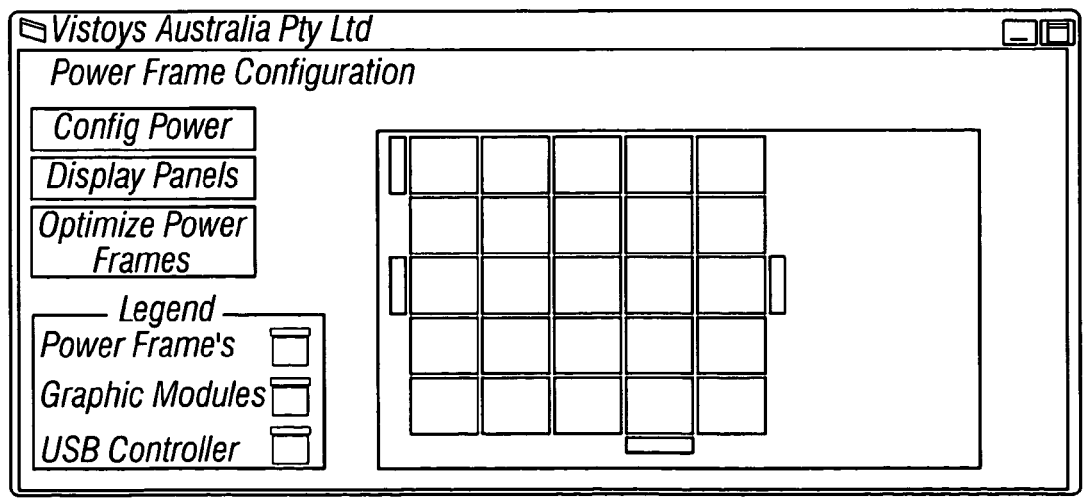
FIG. 15 shows a user interface showing possible locations for different kinds of frame attachments.

FIG. 15 shows how a color-coded system shows where the different power frames and USB controller's can be desired.

The cosmetic frame attachments provide a cosmetic look to the overall system to match the power and USB frame attachments and may supply some structural integrity.

Figure 17A:
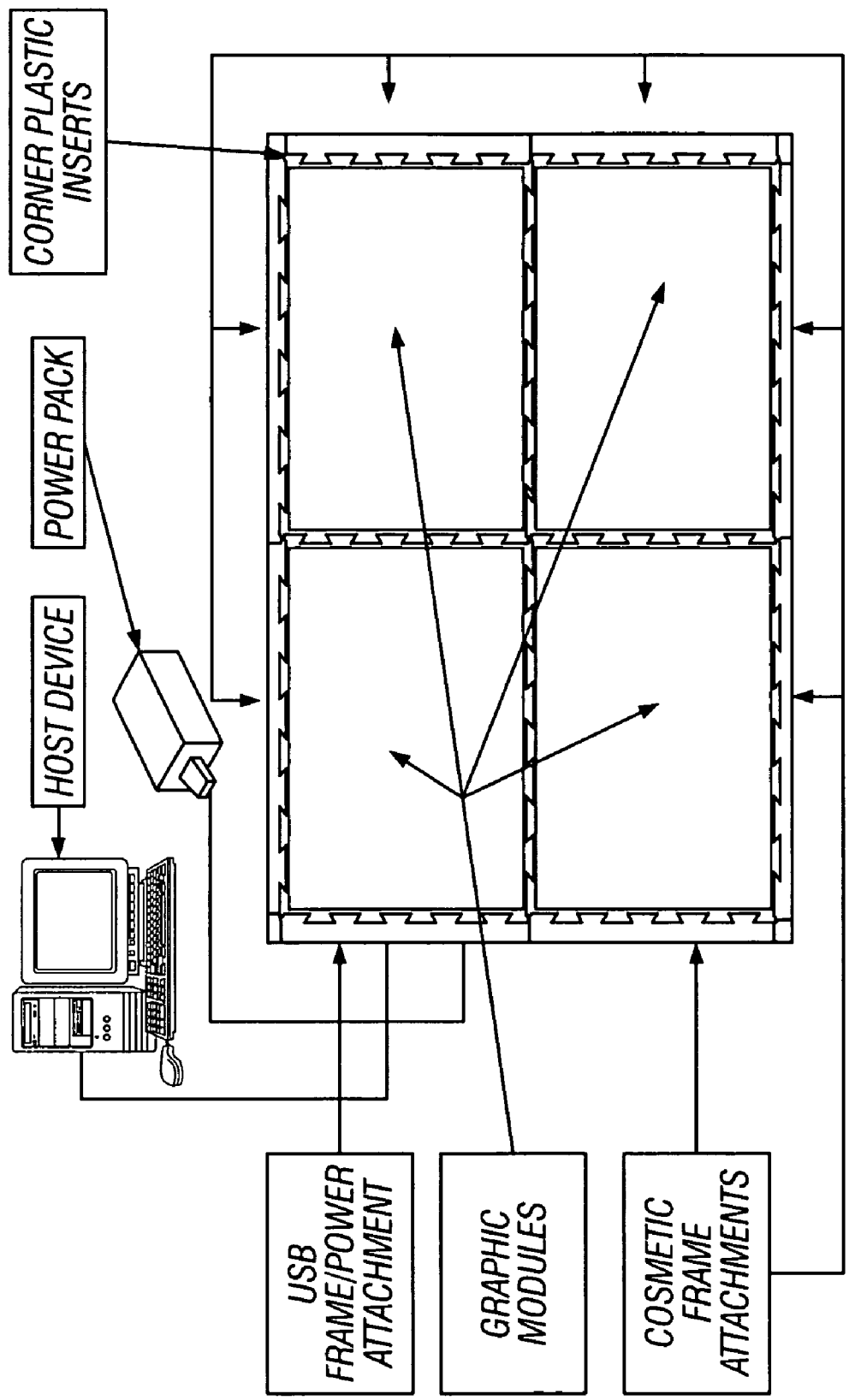
FIG. 17A shows how different frame attachments may be attached at different locations.

An assembled device may have the arrangement shown in FIG. 17A. This shows the various graphic modules, USB and power attachments, corner inserts and cosmetic corner inserts.

Figure 17B:
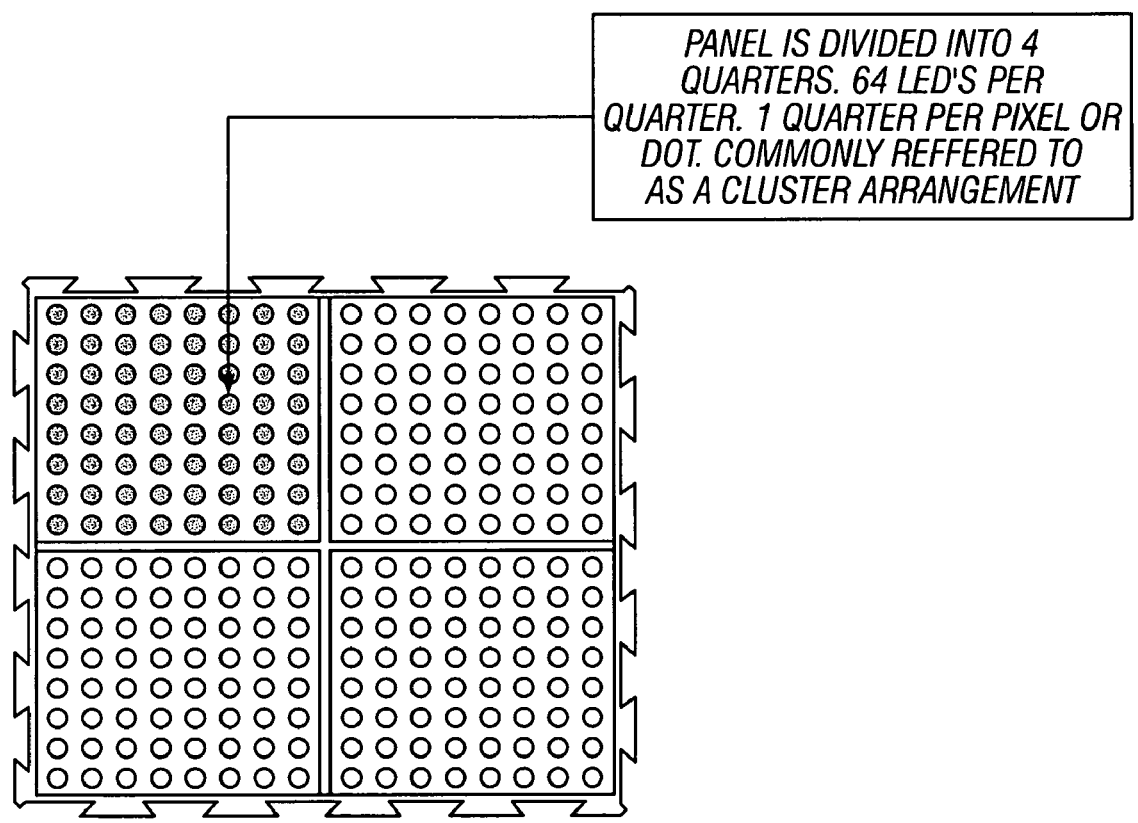
FIG. 17B illustrates the quarter panel pixel format.

The above has described control of each LED as though the LEDs may be controlled individually. FIG. 17B illustrates an alternative embodiment using quarter panel configurations. Applications such as billboards and scoreboards are often viewed from hundreds of meters away. In these systems, a typical pixel size may be between 5 and 10 inches. Therefore, the LEDs are grouped into clusters of 64 LEDs to allow enlarged pixel formats. The quarter panel pixel formats are shown in FIG. 17B. In an alternative embodiment, tricolor LEDs may be used for the quarter pixel formats, thereby enabling color, quarter unit pixel, format.

While the above has discussed a single USB controller, multiple USB controllers can be used without disruption in order to multi-task sections of a large display. This may be helpful when running live video or large applications. As described above, multiple power frame attachments can also be used for various functions such as recording and displaying time and temperature.

While the above has described using the units as modular graphics panels, different applications for these units are also possible.

Another embodiment describes a liquid crystal panel, which may be 2 inches square or 4 inches square. These liquid crystal panels may use the same basic housing and set up structure, with smaller panels.

The liquid crystal model may have very low power consumption, and may sustain an image for as long as 31 days without applied power. Power is required to change the images, but very little power is required to maintain the image. This model may be used for different applications including airport information systems, interactive educational toys, indoor video screens and advertisement displays.

Figure 18A:
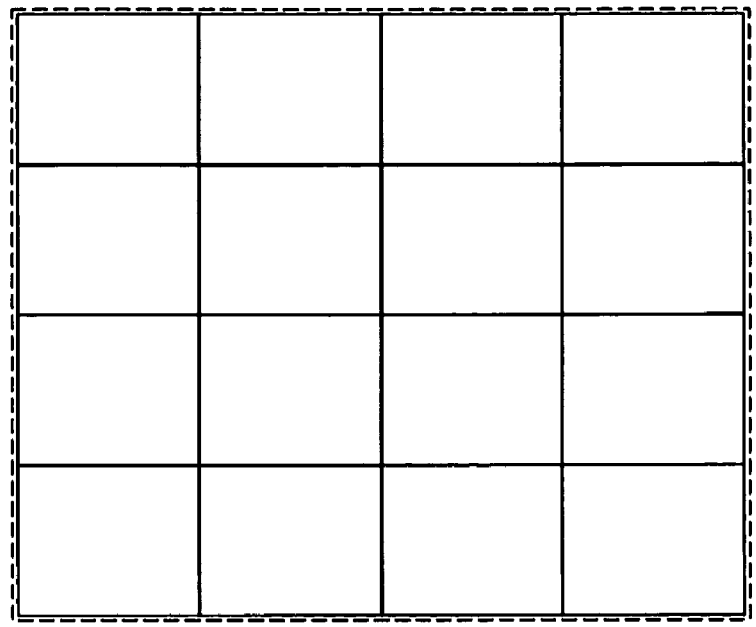
FIGS. 18*a*-18*d* show an alternative embodiment where the display device is used as a puzzle.

One special application of the unit is in an electronic jigsaw puzzle, as illustrated in FIGS. 18A-18D. In order to use the electronic jigsaw puzzle, first a desired number of units are interconnected as shown in FIG. 18A, and that is followed by downloading the selected image from an internet site or using an image stored on the computer.

Figure 18B:
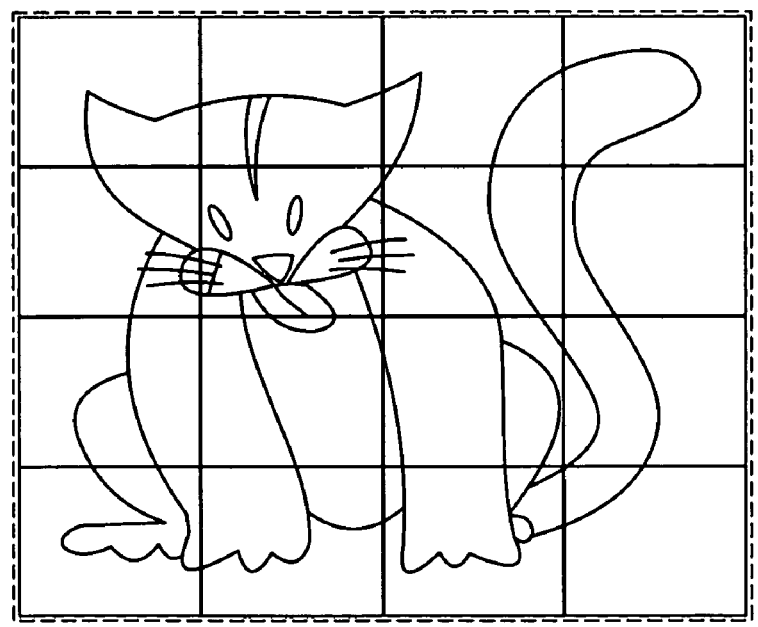
Figure 18C:
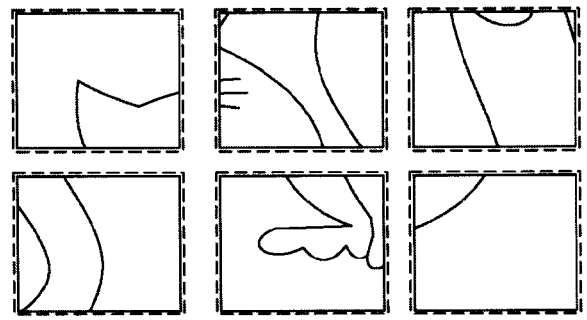
Figure 18D:
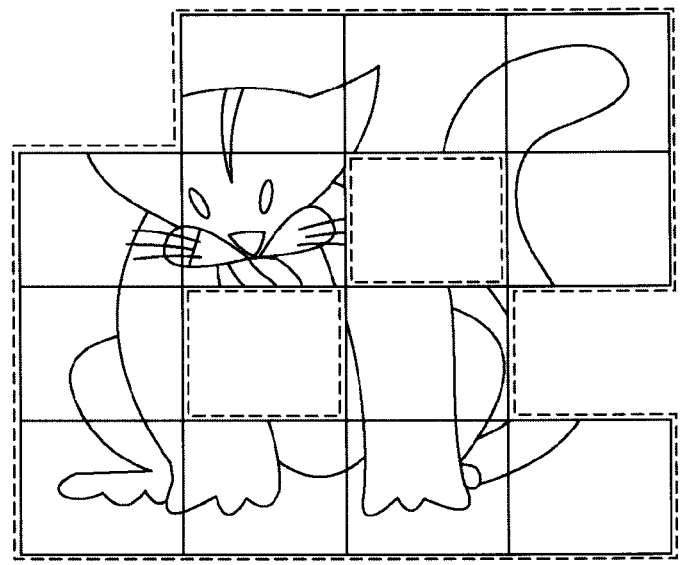

FIG. 18B shows the selected image being displayed on the interconnected jigsaw panel. The panels are then disassembled as shown in FIG. 18C. Because of the low power consumption the downloaded image stays present even with no power attached. The puzzle assembler then assembles the selected pieces, trying to form the downloaded image as shown in FIG. 18D.

Although only a few embodiments have been disclosed in detail above, other modifications are possible. All such modifications are intended to be encompassed within the following claims. For example, while the above has not discussed color at all, it should be understood that a tricolor LED may be used to emit three colors, red green and yellow. This can produce a multiple color display.

What is claimed is:

1. A modular graphics paneled assembly comprising:
a first modular block, including a display surface, an edge portion defining at least plural flat surfaces, first contacts for power distribution and second contacts for signal distribution, located with electrical contacts exposed on at least first and second of said plural flat surfaces, and a mechanical interlock portion formed on the edge surface, said mechanical interlock portion shaped to form a trapezoidal portion that has a first portion with said first flat surface, and said second flat surface, and first and second angled portions that extend between said first and second flat surfaces and are non-perpendicular to either of said first or second flat surfaces, said trapezoidal portion allowing in a way that allows said first modular block to be connected or disconnected from structure associated with another modular block by moving one of said blocks in a direction substantially perpendicular to said display surface, and said mechanical interlock portion also shaped to prevent said first modular block from being connected or disconnected from structure associated with another modular block by motion in a direction substantially parallel to said display surface.

2. An assembly as in claim 1, further comprising a second modular block that forms said another block, where the trapezoidal portion of said first modular block interlocks with a corresponding trapezoidal portion of said second modular block, and the first contacts of said first modular block are connected to the first contacts of said second modular block.

3. A modular graphics paneled assembly comprising:
a first modular block, including a display surface, an edge portion defining at least one flat surface, first electrical contacts for power distribution and second electrical contacts for signal distribution, located on said at least one flat surface, and a mechanical interlock portion formed on the edge surface, and tristate buffers, connected to said second contacts, allowing each of said second contacts to be used to used as either input or output contacts depending on an orientation of a modular blocks.

4. An assembly as in claim 2, further comprising a frame assembly, surrounding said first and second modular blocks, and at least one portion of said frame assembly connected to said first and second contacts.

5. An assembly as in claim 4, wherein said assembly includes four of said modular blocks arranged into a substantially rectangular shape.

6. An assembly as in claim 4, wherein said frame assembly includes Universal serial bus circuitry, receiving a universal serial bus signal, and communicating said Universal Serial Bus signal to said second contacts.

7. An assembly as in claim 1, wherein each of said modular blocks includes a plurality of light emitting diodes.

8. A modular graphics paneled assembly comprising:
a first modular block, including a display surface, an edge portion defining at least first and second flat surfaces, first electrical contacts for power distribution and second electrical structure for signal distribution, located on said at least one flat surface, with electrical contacts exposed on at least said first and second flat surfaces and a mechanical interlock portion formed on the edge surface to form a trapezoidal portion that has a first portion with said first flat surface, and said second flat surface, and first and second angled portions that extend between said first and second flat surfaces and are non-perpendicular to either of said first or second flat surfaces;
a second modular block, where the mechanical interlock portion of said first modular block interlocks with a corresponding mechanical interlock portion of said second modular block, and the first contacts of said first modular block are connected to first contacts of said second modular block.

9. A modular display unit comprising:
a symmetrical housing, having a front surface with a controllable display portion thereon, and edge portions with mechanically interlocking portions thereon, each mechanically interlocking portion on one of said edge portions being sized and shaped to interlock with an edge portion on the associated with a different one of said housings, and said mechanically interlocking portion shaped and sized to allow connecting to and separating from other mechanically interlocking portions associated with other housing by motion in a direction substantially perpendicular to said front surface of said housing, and prevents said connecting and separating in a direction substantially parallel to said front surface of said housing, and said housing including a connector portion thereon supplying an electrical connection and and an electrical signal connection to said display portion, wherein said connector portion is formed on said edge portion, said edge portion forms a substantially trapezoidal shape with a first portion with a first flat surface, and a second flat surface, and first and second angled portions that extend between said first and second flat surfaces and are non-perpendicular to either of said first or second flat surfaces, and wherein said connector portion is formed on both said first and second flat surfaces.

10. A unit as in claim 9, wherein said connector portion is formed on each surface of said edge portion.

11. A unit as in claim 9, wherein said modular unit is formed with an outer perimeter having substantially linear portions forming a substantially square outer perimeter, and said connector portion is formed on each of said linear portions.

12. A unit as in claim 9, wherein said mechanically interlocking portion is formed of a specified shape to only connect to the units which have their top faces in the same direction.

13. A unit as in claim 9, further comprising tristate buffers, connected to said connectors.

* * * * *